Sept. 8, 1936.  D. E. JENKINS  2,053,831
FLASH REMOVER
Filed April 6, 1936  2 Sheets-Sheet 1
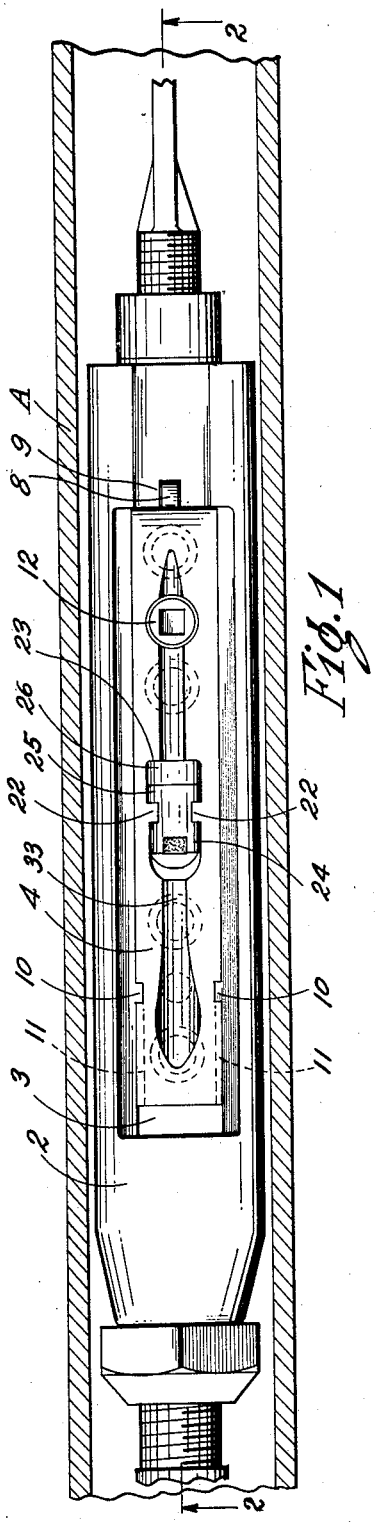
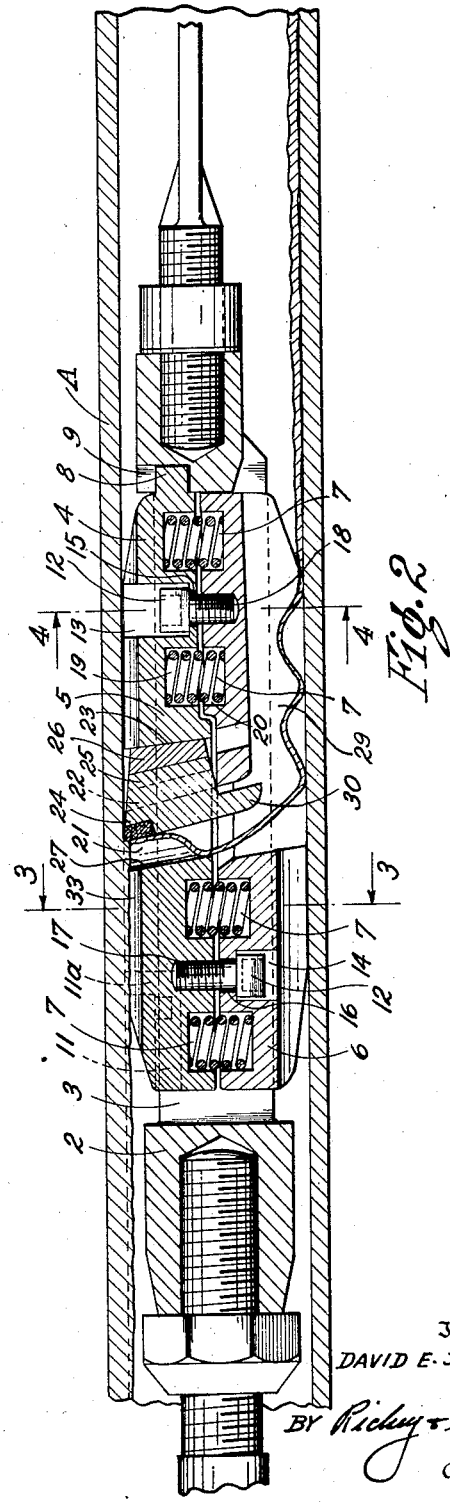
Inventor
DAVID E. JENKINS
By Richey & Watts
Attorneys Sept. 8, 1936. D. E. JENKINS 2,053,831
FLASH REMOVER
Filed April 6, 1936 2 Sheets-Sheet 2

Inventor
DAVID E. JENKINS
By Richey & Watts
Attorneys

Patented Sept. 8, 1936

2,053,831

UNITED STATES PATENT OFFICE 2,053,831

FLASH REMOVER

David E. Jenkins, Niles, Ohio, assignor to Republic Steel Corporation, Cleveland, Ohio, a corporation of New Jersey Application April 6, 1936, Serial No. 72,975

8 Claims. (Cl. 90—24)

This invention relates to means for removing burr or flash metal from the interior of a hollow article, such as a pipe or tubing especially of the electric resistance butt-welded type.

Certain devices heretofore employed for removing metal such as flash from the inside wall of hollow articles have consisted of a plug rod and a cutting tool which was fixed to and movable only with the rod. Rollers or similar means carried by the rod and engaging the inner surfaces of the pipe were relied on to position the tool relative to the flash and the walls of the pipe. Such devices required delicate adjustment to insure proper positioning of the cutting tool with respect to the flash. Wear and tear on the parts of the device and the non-uniformity of the pipe in diameter and contour made it difficult to maintain the cutting tool in proper flash removing position at all times and over extended periods of use. Furthermore, an undue amount of time and expense was involved in replacing the device when breakage occurred or when the cutting tool became dull.

By the present invention, I have provided a device for removing metal from the inside wall of a hollow article which is relatively simple in construction and which avoids the objections of the foregoing prior devices. While the invention is applicable for supporting any desired type of tool within a hollow article, I have chosen for illustration a construction to be used for removing burr or flash metal from the inside of a pipe or tube having a substantially circular cross section. The preferred embodiment of this invention comprises a plug rod in which a tool carrying unit is mounted for limited movement relative to the plug rod so that the tool may maintain itself automatically in a predetermined position relative to the flash and walls of the pipe regardless of changing contour and diameter of the pipe, within certain limits. The cutting tool and other parts of the device subjected to wear can be easily removed from the plug rod and substitute parts readily inserted in the plug rod without involving undue delay or expense, or requiring delicate adjustments. By avoiding the use of rollers and controlling the maximum outside diameter of the tool carrying unit, the pressure of the unit on the pipe may be controlled and as a result the wear on the unit may be kept down to a minimum amount.

The foregoing and other advantages of my invention and the invention itself will become more apparent from the following detailed description of an embodiment thereof taken in conjunction with the accompanying drawings illustrating one form of my invention, wherein:—

Fig. 1 is a top plan view of an inside flash removing device embodying the present invention shown as operatively disposed within a pipe;

Fig. 2 is a section taken on the line 2—2 of Fig. 1;

Throughout the drawings and specification like parts have been designated by like reference characters.

Figure 3:
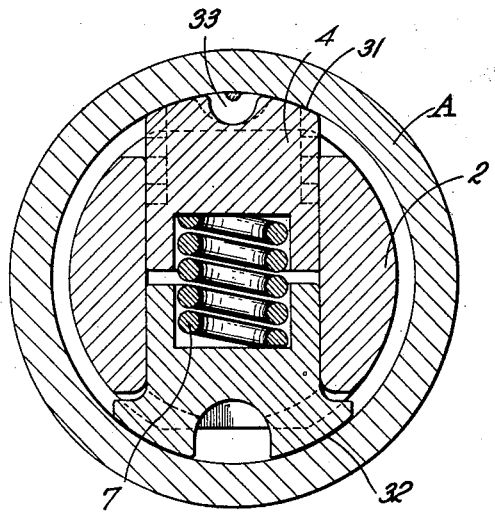
Fig. 3 is a vertical sectional view taken on the line 3—3 of Fig. 2.

In Figures 1 and 2 of the drawings there is illustrated a preferred embodiment of my invention operatively disposed within a pipe "A". The flash remover comprises a frame or plug rod 2 having an opening 3 extending therethrough in which a tool carrying unit 4 is mounted for limited movement relative to the plug rod. The unit 4 includes a pair of pipe engaging members 5 and 6 having springs 7 disposed therebetween. One end of the unit 4 is operatively positioned within the opening 3 by means of a projecting lug 8 formed thereon which seats within a reduced extension 9 of the opening 3. The side walls of the opening 3 are provided with inwardly extending projections 10 which engage longitudinal grooves 11 formed in the member 5 and serve to support the other end of the unit 4. The grooves 11 are of greater width than the height of the projections 10 so that the unit as a whole may have limited movement within the opening 3. The grooves 11 are intersected by vertical grooves 11a extending therefrom to the top of the member 5 to permit the unit to be inserted from the bottom of the opening 3.

The tool carrying unit 4 which is shown more in detail in Figures 2 to 6, inclusive, includes the top member or tool holder 5 and the bottom member or shoe 6, these members being secured or assembled together by means of cap screws 12. The members 5 and 6 are provided with cylindrical bores 13 and 14, respectively. These bores have portions 15 and 16, respectively, of reduced diameter, the end surfaces of which engage the heads of the cap screws 12 and serve as stops for limiting the extent of movement of the members 5 and 6 away from each other. The head and shank portion of the cap screws 12 are slidably received within the cylindrical bores 13 and 14 and the ends thereof are threaded into openings 17 and 18 of the respective members 5 and 6. A plurality of aligned recesses 19 and 20 are provided in the members 5 and 6 which, when the unit 4 is assembled receive the springs 7. These springs normally urge the two members apart until the heads of the cap screws 12 engage the ends of the reduced portions 15 and 16 of the bores 13 and 14. However, when the device is operatively disposed within a pipe the heads of the cap screws are spaced far enough from the ends of the bores to permit the springs to press both of the members 5 and 6 against the inside surface of the pipe. Thus, undue wear of members 5 and 6 is avoided. Since the pipe contacting areas of members 5 and 6 are approximately equal any wear which occurs will be more or less equal on each member.

The tool holder 5 of the unit 4 is provided with an opening 21 extending therethrough, the opposite side walls of which have inwardly extending ribs 22 disposed at an angle with respect to the end wall 23 of the opening 21. A cutting tool 24 having flanges 25 formed thereon is positioned within the opening 21. The flanges 25 are slidably received in the slots formed by the ribs 22 and the end wall 23 of the opening 21. A wedge 26 is inserted between the end of the tool and the end wall 23 and serves to maintain the tool in the desired angle and position.

The end of the opening 21 opposite the end wall 23 defines a passageway 27 through which hot severed flash metal may pass through the member 5 after it has been severed from the welded seam of the pipe by the tool 24. This passageway communicates with a vertical passage 28 in the bottom member 6 of the unit 4. The bottom of the member 6 is provided with a longitudinal groove 29 of gradually increasing cross-sectional area extending from the passage 28 to the end of the unit. The provision of this groove construction prevents any clogging of the unit by the severed flash which being in a plastic condition, as it is cut from the seam, has a tendency to gather up and increase in cross section. The tool 24 is provided with a downwardly extending portion 30 which extends into the passage 28 of the lower member 6 and presents a smooth guiding wall for the severed flash until it is directed onto the inner surface of the pipe within the groove 29.

Figure 4:
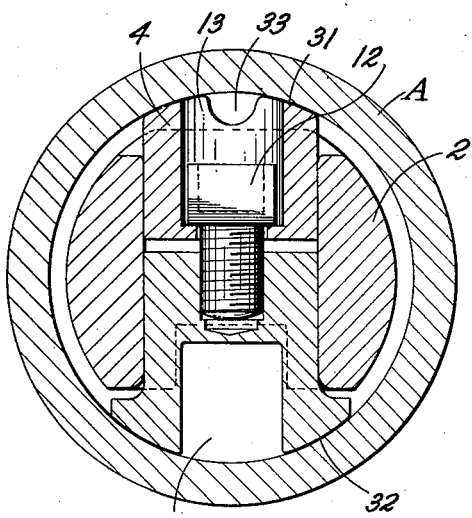
Fig. 4 is a vertical sectional view taken on the line 4—4 of Fig. 2.
Figure 5:
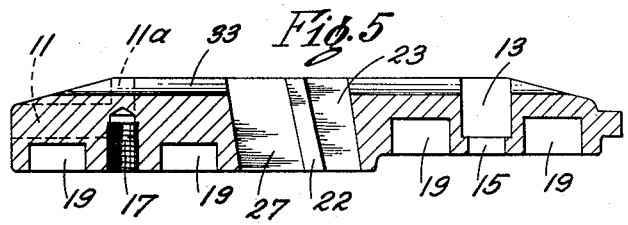
Figures 5 and 6 are vertical sections through the longitudinal axis of the tool holding unit illustrating the top and bottom portions thereof, respectively, in disassembled relation.
Figure 6:
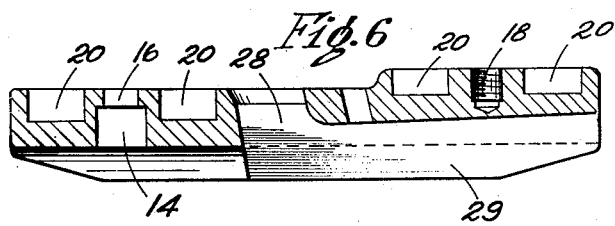

As more particularly illustrated in Figures 3 and 4 the members 5 and 6 are provided with pipe engaging surfaces 31 and 32, respectively, which are normally urged against the inside surface of the pipe by the springs 7. These surfaces are curved to conform generally to the inside surface of the pipe "A" and slidably engage the same when the device is positioned within the pipe. The curved surface 31 of the member 5 is interrupted by a longitudinal groove 33 which straddles the seam of the pipe and extends substantially throughout the length of the tool carrying unit.

In assembling the tool carrying unit within its supporting structure the unit is introduced into the opening 3 from the bottom thereof. The projections 10 slidably engage the vertical grooves 11a in the member 5 of the unit until they are aligned with the longitudinal grooves 11, whereupon the unit is pushed lengthwise of the opening 3 to bring the lug 8 into groove 9, which supports one end of the unit, and to bring projections 10 into grooves 11, where the projections engage the top wall of the grooves thereby supporting the adjacent end of the unit. The device is then in position to sever or remove flash metal from the seam of the pipe.

When the plug rod and the tool carrying unit 4 are assembled as just described and the device is disposed within a pipe, the cutting tool 24 will be automatically positioned in proper flash or burr cutting position with respect to the seam of the pipe "A" and will maintain such position within a predetermined range of contours and diameters of the pipe. The unit 4 has a limited vertical movement within the opening 3 and the members 5 and 6 have limited movement relative to each other. Thus the unit will automatically adjust itself to variations, within predetermined limits, in the contour, shape, location and diameter of the pipe, and will maintain the tool 24 in a predetermined position with respect to the inner surface of the pipe and flash.

When it is necessary to replace tools which have become broken or dulled, it is not necessary to remove the plug rod or any of its associated equipment, for the tool carrying unit can be readily replaced by a similar unit carrying a new or sharpened cutting tool.

In the construction illustrated and described the tool holder is stationary while the pipe moves and the broach type cutting tool is positioned to remove burr or flash metal without cutting into the wall of the pipe or hollow article. It will be understood, however, that the invention in its broader aspects is applicable to a construction for supporting any desired type of tool for relative movement within a hollow article of any cross sectional shape. Likewise a broach or other type of cutting tool may be used for cutting slots or keyways in a hollow article or for performing any other cutting operation within the article.

Having thus described my invention so that those skilled in the art may understand the same, I have set forth what I desire to secure by Letters Patent in the appended claims.

I claim:

1. In a device for removing metal from the inside of a hollow metal article, a frame, a cutting tool associated therewith, means mounted in said frame for maintaining said cutting tool in cutting position with respect to the metal to be severed, said means including spaced members slidably engaging opposite inner surfaces of the article; and resilient means disposed therebetween to urge said members against said surfaces.

2. A device for removing welding flash metal from the inside of a longitudinally welded pipe comprising a supporting frame, a tool carrying unit mounted in said frame for limited transverse movement relative thereto, a cutting tool carried by said unit, and resilient means urging said tool carrying unit against the inner surface of said pipe and relative to the supporting frame.

3. A device for removing welding burr or flash metal from the inside of a longitudinally welded pipe comprising an elongated supporting frame having an opening therein, a readily removable tool carrying unit mounted in said opening, said unit including members slidably engageable with the inner surface of said pipe, resilient means disposed therebetween to urge said members against opposite inner surfaces of the pipe and means securing the members together for limited relative movement transversely of the frame, one of said members having an opening, and a cutting tool mounted in said opening.

4. A device for removing welding flash metal from the inside of longitudinally welded pipe comprising an elongated supporting frame, tool carrying means mounted in said frame, said means including members slidably engageable with the inner surface of said pipe, resilient means disposed therebetween to urge said members against opposite inner surfaces of the pipe, said members having aligned openings therethrough, a cutting tool carried by one of said members and mounted in said openings for severing flash metal, said openings serving to direct severed flash metal from the vicinity of the cutting tool and onto the inside surface of the pipe remote from the point of removal.

5. A device for removing flash metal from the inside of a longitudinally welded pipe comprising an elongated supporting frame having an opening therethrough, tool carrying means mounted in said opening, said means including members slidably engageable with the inner surface of said pipe, a cutting tool carried by one of said members and resilient means adapted to urge the tool carrying member against the inner surface of the pipe to maintain the cutting tool in cutting position with respect to the seam of the pipe.

6. In a device of the class described, a tool carrying means arranged for operation within a hollow article, a tool held in operative position by said carrier and mounted for movement transversely of said carrier toward and away from said article, and means for maintaining said tool in predetermined relation with respect to an inner surface of said article irrespective of the relative position of said surface and said carrier.

7. In a device of the class described, a supporting member adapted to be positioned inside of a hollow tubular article, a tool carrier mounted in said member for free limited movement longitudinally and transversely of said member, and a tool carried by said carrier.

8. In a device of the class described, a supporting member adapted to be positioned within, and to be movable transversely relative to, a hollow tubular article, tool carrying means supported by said member and engageable with opposed inner surfaces of said article, said means and member being connected for free limited relative transverse movement, and a cutting tool carried by said means and engageable with said article.

DAVID E. JENKINS.